United States Patent Office 3,614,967
Patented Oct. 26, 1971

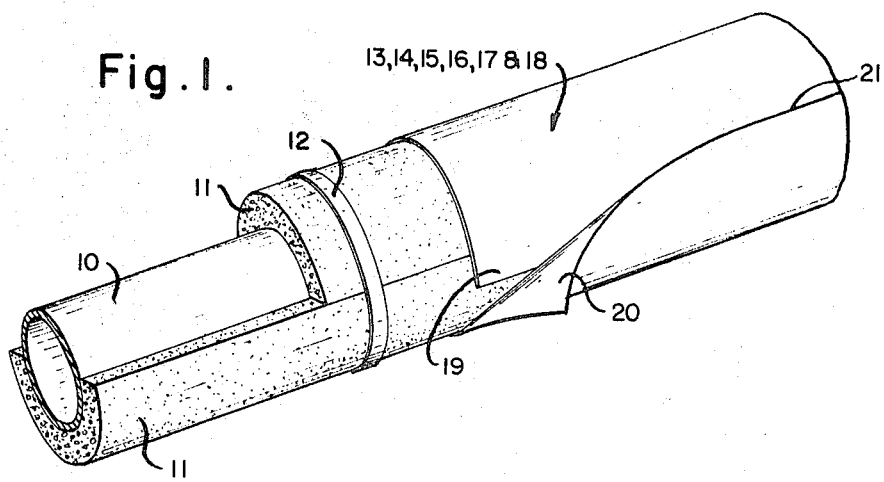
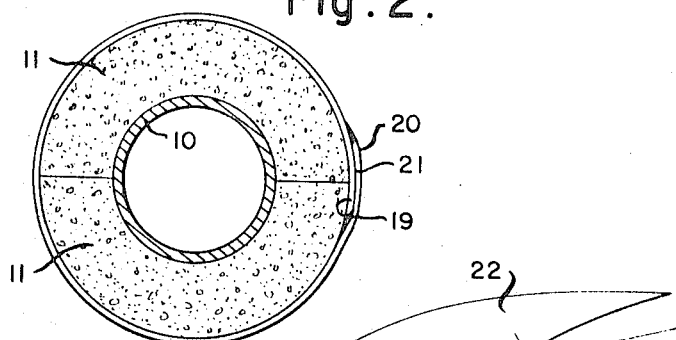
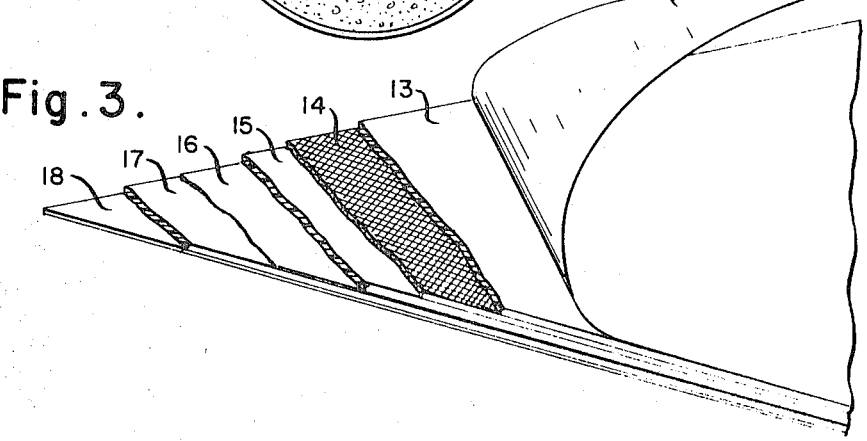
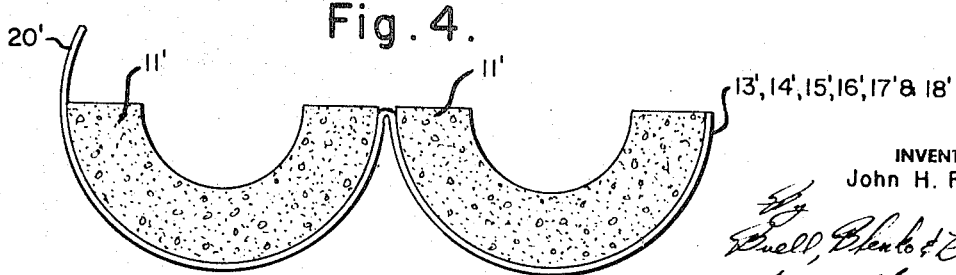

3,614,967
MULTILAYERED PIPE COATINGS AND COATED PIPE
John H. Royston, Pittsburgh, Pa., assignor to Royston Laboratories, Inc.
Filed Oct. 8, 1968, Ser. No. 765,836
Int. Cl. B32b 3/30; F16l 57/00, 59/02
U.S. Cl. 138—141                  10 Claims

ABSTRACT OF THE DISCLOSURE

A pipe coating, a coated pipe and method of forming such coated pipe are disclosed wherein the pipe is surrounded by preformed insulation such as glass foam and the insulation is surrounded by a mat made up of a first layer of heat softening resin, a surrounding layer of woven glass fabric, a second layer of said resin, a layer of conductive foil, a third layer of said resin and an outer layer of water impervious plastic film, said mat being placed with overlapping edges which are heat sealed together.

---

This invention relates to pipe coatings and coated pipe and particularly to an insulated and moisture impervious coating and coated pipe for steam, hot water and chilled water systems, above ground or sub-surface.

The need for a water impervious insulating jacket, particularly for underground steam, hot water and chilled water systems, has long been recognized. This invention will be particuarly described in connection with such sub-surface applications but the same structure and methods are equally applicable above ground. Many attempts to provide such a highly insulative protective coating to pipes have been made but without complete success. Probably the most satisfactory system prior to the present invention was to place preformed foam glass mats around the pipe and to attach these by means of an underground cold applied mastic. Experience has shown that any motion from expansion and/or contraction would cause the mastic and glass to crack or check, particularly at the butt ends of the foam glass. These checks and cracks would open in a relatively short period of time sufficiently to permit moisture to go through the insulating and water-proofing system directly to the pipe. This would permit deterioration of the system by corrosion and reduce the insulating value to the extent that it was not practical for use.

I have discovered a pipe coating, a coated pipe structure and a method of applying the same which overcomes these problems. My system provides a pipe coating, which has a very high insulating value, is water impervious, protective against corrosion and highly resistant to cracking and damage by underground objects such as rocks and the like.

Preferably I provide a coating comprising at least two preformed insulating members capable of surrounding a pipe to be coated in abutting relationship and a surrounding mat including a layer of heat softening resin, a layer of woven glass fabric, a second coating of said resin, a layer of conductive metal foil, a third layer of resin and an outer layer of water impervious plastic sheeting, said mat surrounding the insulating members and overlapping at adjacent edges. The adjacent edges of the mat are heat fused on the adjoining surfaces. Preferably the mats are made up with a release paper on the first resin layer which is removed prior to application to the foam glass insulating members, the mat is wrapped around the insulating member, the outer plastic sheet melt along one joining edge, the other edge is overlapped over the said one melted edge and heated to fuse the edges together. Alternatively the insulating members may have the mat applied in the factory with a loose overlapping edge so that the mat acts as the hinge between members and the whole assembled on a pipe in the field and heat sealed along the overlapping edge. Preferably the insulating members are made of formed foam glass, magnesia block, asbestos, cork or foamed plastic such as polyurethane, styrene or the like.

The invention appears to derive its great effectiveness in part from the layer of conductive metal foil which acts to shield the underlying layers of resin from excessive heat used when the joint is heat sealed. In the absence of this metal foil layer the heat required to melt the outer plastic layer would soften and degrade the entire resin system to a point where its effectiveness as a barrier would be lost.

Preferably the metal foil is aluminum and the outer plastic film is Mylar (polyester resin).

In the foregoing general description of my invention I have set out certain objects, purposes and advantages of this invention. Other objects, purposes and advantages will be apparent from a consideration of the following description and the accompanying drawings in which:

FIG. 1 is an isometric view partly broken away of a pipe coating according to my invention;

FIG. 2 is an enlarged section on the line II—II of FIG. 1;

FIG. 3 is an enlarged section of the outer mat used in the coating of FIG. 1 showing the removable release paper; and FIG. 4 is a section of a second embodiment of a coating according to my invention.

Referring to the drawings I have illustrated a pipe 10 over which is applied two semi-cylindrical preformed foamed glass insulating members 11 held in place by tape 12. An outer mat made up of a layer of resin 13 having a softening point between about 210° and 230° F. and a needle penetration of 27 at 77° F., a layer of woven glass fiber 14, a second layer of said resin 15, a sheet of aluminum foil 16, a third layer of said resin 17 and an outer sheet of Mylar 18, all bonded together by the resin layers 13, 15 and 17. The side edges 19 and 20 of the mat are overlapped to form a seam 21 which is heat sealed with a torch by the steps of first heating edge 19, then overlapping edge 20 and finally heating edge 20 to cause the seam to fuse. The mat is preferably shipped with a release paper 22 which is removed just prior to application of the mat to the foam glass members 11.

In FIG. 4 I have illustrated a second embodiment of my invention in which the parts are identical and bear like numbers with a prime sign. In this embodiment the foam glass insulating members 11' are applied to the mat in the factory and shipped as a complete assembly with the mat acting as a piano hinge at the joints and a free overlapping edge 20' being provided for making seam 21' as described in connection with the embodiment of FIGS. 1–3.

The resin layers 13, 15 and 17 may be a thermoplastic, very high molecular weight (100,000+) hydrocarbon condensation polymer having a ring and ball softening point ASTM D–36 of 210°–230° F. and a penetration at 77° F. ASTM D–5 of 25°–30° F.

This composition is not critical and other resin systems may be substituted therefor. For example, the following compositions among others are satisfactory under certain conditions: polymer modified coal tar, asphalt, resin modified asphalt and other similar thermoplastic resins.

While I have used Mylar as an outer coating in this example other resin films may be used such as polyethylene and the like.

I have set out certain preferred embodiments and practices of my invention in the foregoing examples, however, it will be understood that this invention may be otherwise embodied within the scope of the following claims.

I claim:
1. A heat and electrical insulating and waterproofing pipe coating for both above and underground use comprising at least two preformed insulating members adapted to surround the periphery of a pipe to be coated in abutting relationship and a surrounding mat including a layer of heat softening polymeric resin adjacent the insulating members, a layer of woven glass fabric, a second layer of said polymeric resin, a layer of conductive foil, a third layer of said polymeric resin and an outer layer of water impervious plastic film, said mat surrounding the insulating members and being heat sealed at adjacent edges.

2. A coating as claimed in claim 1 wherein the layer of conductive foil is aluminum.

3. A coating as claimed in claim 1 wherein the outer layer of water impervious film is polyester film.

4. A coating as claimed in claim 1 wherein the insulating members are foam glass.

5. A coated pipe assembly for both above and underground use comprising a pipe, a preformed insulating layer surrounding said pipe and an outer mat surrounding said insulating layer, said matting including a layer of heat softening polymeric resin adjacent the insulating layer, a layer of woven glass fabric surrounding said resin, a second layer of said polymeric resin, a layer of conductive foil surrounding said second layer of polymeric resin, a third layer of said resin on said conductive foil and an outer layer of water impervious plastic film, said mat surrounding the insulating layer and being heat sealed at adjacent edges.

6. A coated pipe assembly as claimed in claim 5 wherein the insulating layer is foam glass.

7. A coated pipe as claimed in claim 6 wherein the foam glass insulating layer is made up of at least a pair of preformed glass members.

8. A coated pipe as claimed in claim 6 wherein the conductive foil layer is aluminum.

9. A coated pipe as claimed in claim 6 wherein the abutting edges of said mat are heat sealed.

10. A heat and electrical insulating and waterproofing mat for coating pipe for both above and underground use comprising a first layer of heat softening polymeric resin, a layer of woven glass fabric surrounding said polymeric resin, a second layer of said heat softening polymeric resin, a layer of conductive film surrounding said second layer of resin, a third layer of said heat softening polymeric resin and an outer layer of water impervious plastic film.

References Cited

UNITED STATES PATENTS

| | | | |
|---|---|---|---|
| 3,321,357 | 5/1967 | Kennedy | 138—146 X |
| 3,233,699 | 2/1966 | Plummer | 138—141 X |
| 3,212,529 | 10/1965 | Ullman et al. | 138—141 |
| 3,024,153 | 3/1962 | Kennedy | 138—145 X |
| 2,962,402 | 11/1960 | Sweeney | 138—Cell. |
| 2,939,488 | 6/1960 | Bacon | 138—141 X |
| 2,857,931 | 10/1958 | Lawton | 138—151 X |
| 2,653,887 | 9/1953 | Slayter | 138—145 X |

ROBERT F. BURNETT, Primary Examiner

M. A. LITMAN, Assistant Examiner

U.S. Cl. X.R.

138—149, 170; 161—93, 160; 156—304